United States Patent
Mensler et al.

(10) Patent No.: US 7,904,212 B2
(45) Date of Patent: Mar. 8, 2011

(54) NOISE ESTIMATING DEVICE AND NOISE ESTIMATING METHOD

(75) Inventors: Michel Mensler, Montigny-le-Bretonneux (FR); Yoshiro Takamatsu, Kawasaki (JP); Eiji Furukawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 972 days.

(21) Appl. No.: 11/746,181

(22) Filed: May 9, 2007

(65) Prior Publication Data
US 2007/0265736 A1 Nov. 15, 2007

(30) Foreign Application Priority Data

May 12, 2006 (JP) ................................. 2006-133466

(51) Int. Cl.
*F16F 15/00* (2006.01)
(52) U.S. Cl. ............................................. 701/1; 381/86
(58) Field of Classification Search ........ 701/1; 381/86, 381/71.4, 107, 56–58, 120, 111, 102, 94.1; 327/336–345; 333/19
See application file for complete search history.

(56) References Cited

U.S. PATENT DOCUMENTS

| | | | | |
|---|---|---|---|---|
| 4,562,589 A | * | 12/1985 | Warnaka et al. | 381/71.4 |
| 5,386,372 A | * | 1/1995 | Kobayashi et al. | 700/280 |
| 5,629,986 A | | 5/1997 | Shoureshi | |
| 5,939,625 A | * | 8/1999 | Torii et al. | 73/117.01 |

FOREIGN PATENT DOCUMENTS

| | | |
|---|---|---|
| EP | 0578202 A2 | 1/1994 |
| JP | H04-113946 A | 4/1992 |
| JP | H07-234689 A | 9/1995 |
| JP | H08-292771 | 11/1996 |
| JP | H08-292771 A | 11/1996 |

* cited by examiner

*Primary Examiner* — Dalena Tran
(74) *Attorney, Agent, or Firm* — Global IP Counselors, LLP

(57) ABSTRACT

A noise estimating device includes a plurality of sensors and an estimating section. The sensors are configured and arranged to be positioned in a plurality of prescribed locations on a vehicle body of a vehicle. The sensors are configured and arranged to detect vibrations of the vehicle body. The estimating section is configured to estimate an external vibration value based on the vibrations detected by the sensors and transfer characteristics between the sensors and a vibration input location where an external vibration enters the vehicle body. The estimating section is further configured to estimate a noise within a vehicle interior space based on the external vibration value and a transfer characteristic between the vibration input location and a reference region in the vehicle interior space.

19 Claims, 15 Drawing Sheets

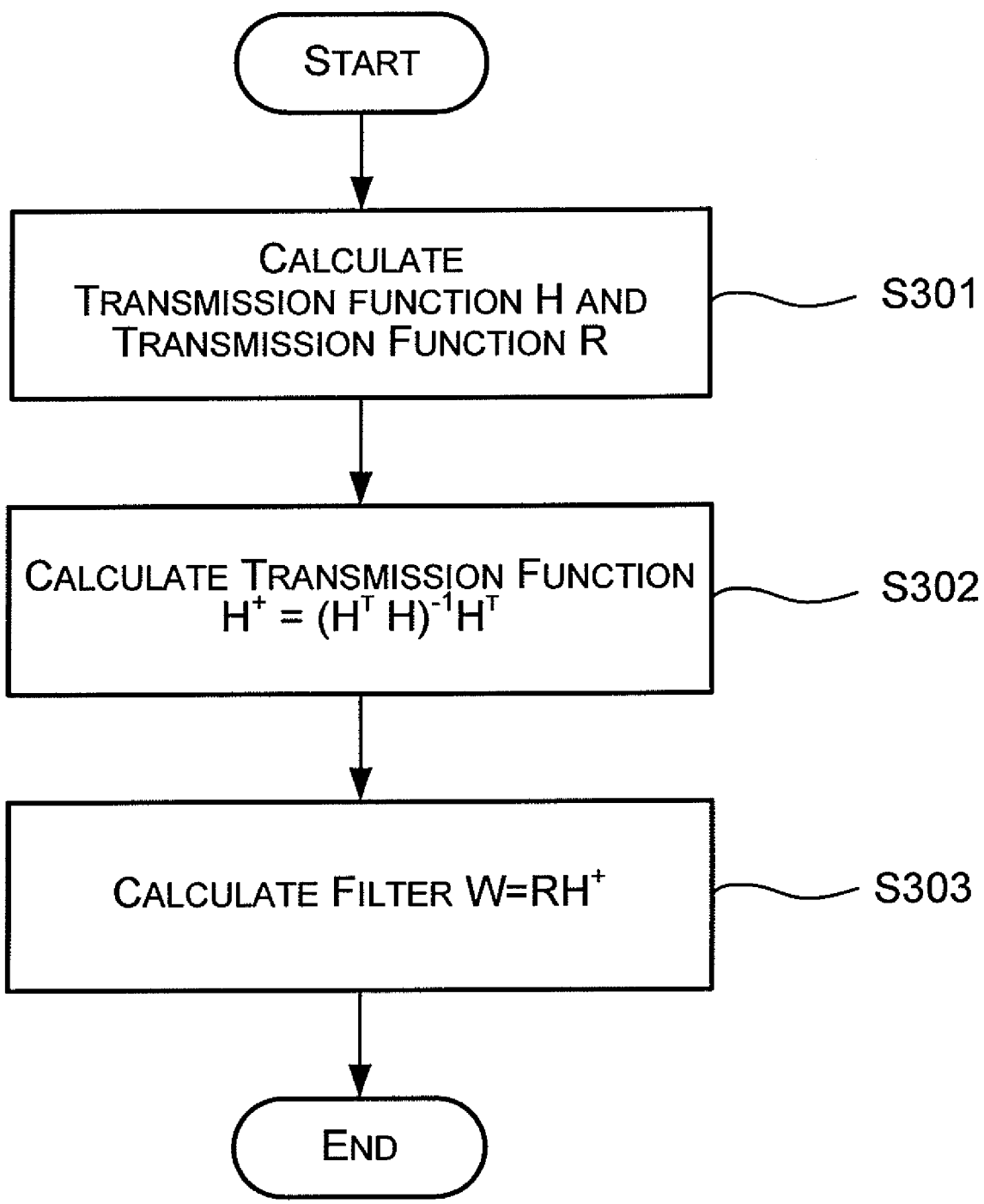
F I G. 8

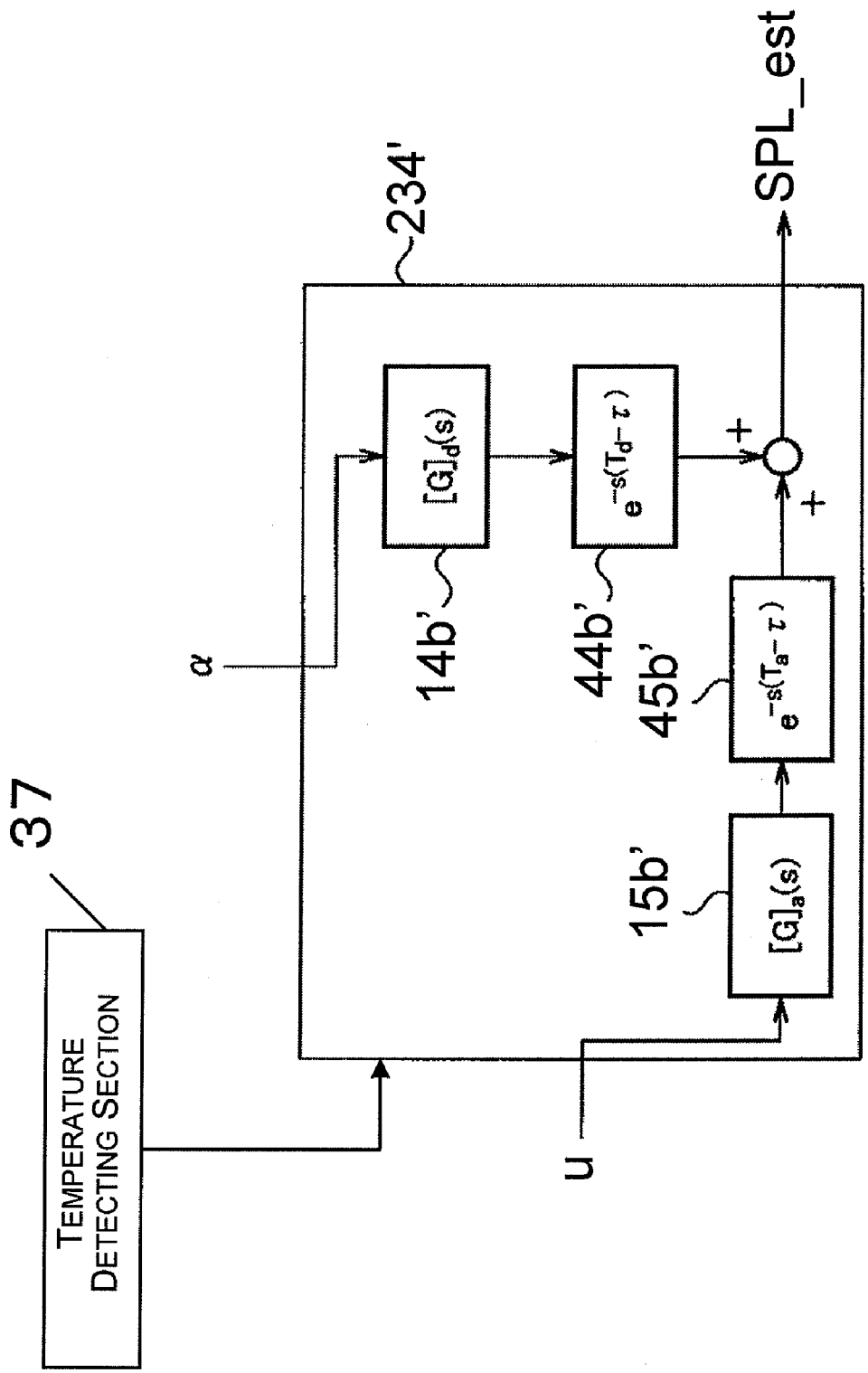
F I G. 13

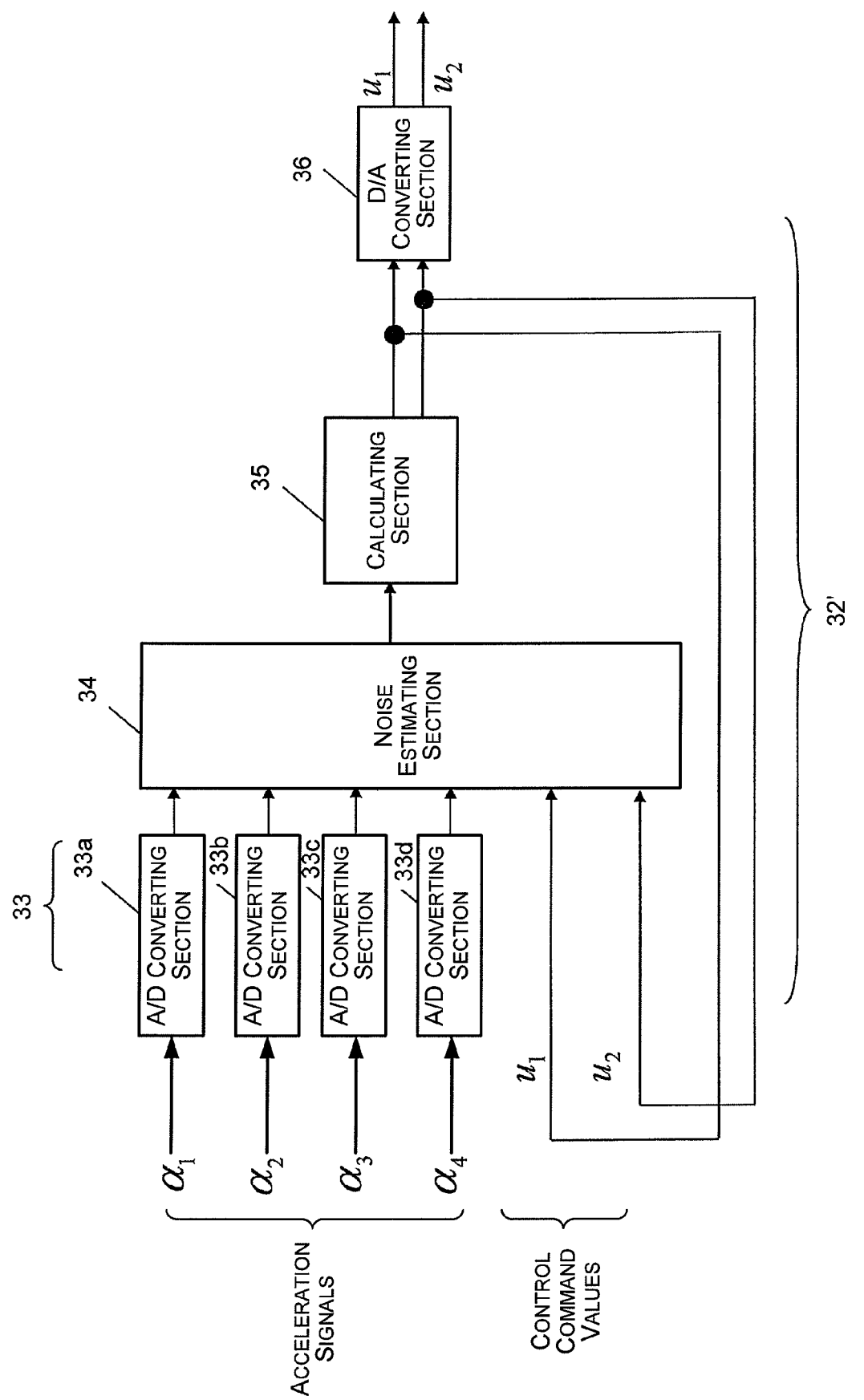
F I G. 15

NOISE ESTIMATING DEVICE AND NOISE ESTIMATING METHOD

CROSS-REFERENCE TO RELATED APPLICATIONS

This application claims priority to Japanese Patent Application No. 2006-133466 filed on May 12, 2006. The entire disclosure of Japanese Patent Application No. 2006-133466 is hereby incorporated herein by reference.

BACKGROUND OF THE INVENTION

1. Field of the Invention

The present invention relates to a noise estimating device and a noise estimating method. More specifically, the present invention relates to a noise estimating device and a noise estimating method adapted to a noise control apparatus for a vehicle configured to control the noise estimated by the noise estimating device or the noise estimating method.

2. Background Information

Japanese Laid-Open Patent Application Publication No. 8-292771 discloses a conventional noise control apparatus that is configured to detect vehicle vibrations by using a plurality of acceleration sensors attached to a vehicle body in a plurality of locations and to estimate the noise produced in an interior space within a vehicle based on the detected vehicle vibrations. The conventional noise control apparatus is then configured to vibrate the vehicle body by using a plurality of actuators attached to the vehicle body to produce a sound wave that cancels out the estimated noise. In such conventional noise control apparatus, the noise is estimated according to the vehicle vibrations detected at the locations that are the main sources of noise production.

In view of the above, it will be apparent to those skilled in the art from this disclosure that there exists a need for an improved noise estimating device and noise estimating method. This invention addresses this need in the art as well as other needs, which will become apparent to those skilled in the art from this disclosure.

SUMMARY OF THE INVENTION

Since the conventional noise control apparatus disclosed in the above mentioned reference is configured to estimate the noise based on the vehicle vibrations detected at the locations that are the main sources of noise production, such conventional noise control apparatus cannot estimate noise caused by vibrations in locations where the sensors are not provided. Therefore, the noise may not be estimated with high accuracy.

Accordingly, the present invention was devised in light of the aforementioned problems, and one object of the present invention is to accurately estimate noise in a vehicle interior space based on detected vehicle vibrations.

In order to achieve the above object and other objects of the present invention, a noise estimating device includes a plurality of sensors and an estimating section. The sensors are configured and arranged to be positioned in a plurality of prescribed locations on a vehicle body of a vehicle. The sensors are configured and arranged to detect vibrations of the vehicle body. The estimating section is configured to estimate an external vibration value based on the vibrations detected by the sensors and transfer characteristics between the sensors and a vibration input location where an external vibration enters the vehicle body. The estimating section is further configured to estimate a noise within a vehicle interior space based on the external vibration value and a transfer characteristic between the vibration input location and a reference region in the vehicle interior space.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 8 is a flowchart of a control process for calculating transfer characteristics in accordance with the first embodiment of the present invention;

FIG. 13 is a schematic diagram of a noise estimating section that is configured to compensate for delay time in accordance with the fourth embodiment of the present invention;

FIG. 15 is a schematic block diagram illustrating an internal configuration of a control command value calculating section of the noise control apparatus in accordance with the fifth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
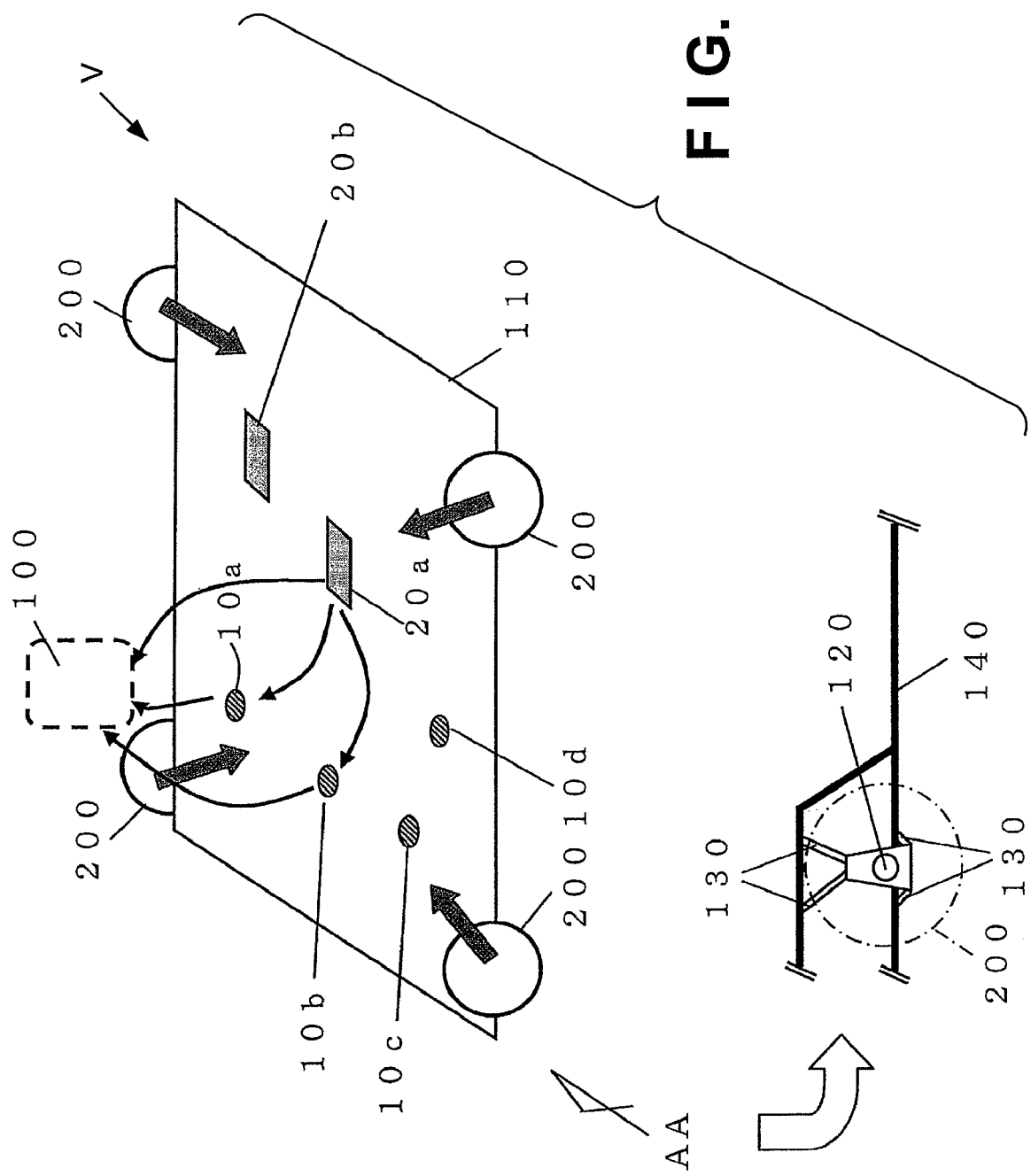
FIG. 1 is a schematic diagram illustrating the main propagation paths of road noise and vibration in a vehicle body due to unevenness of a road surface in accordance with a first embodiment of the present invention.
Figure 2:
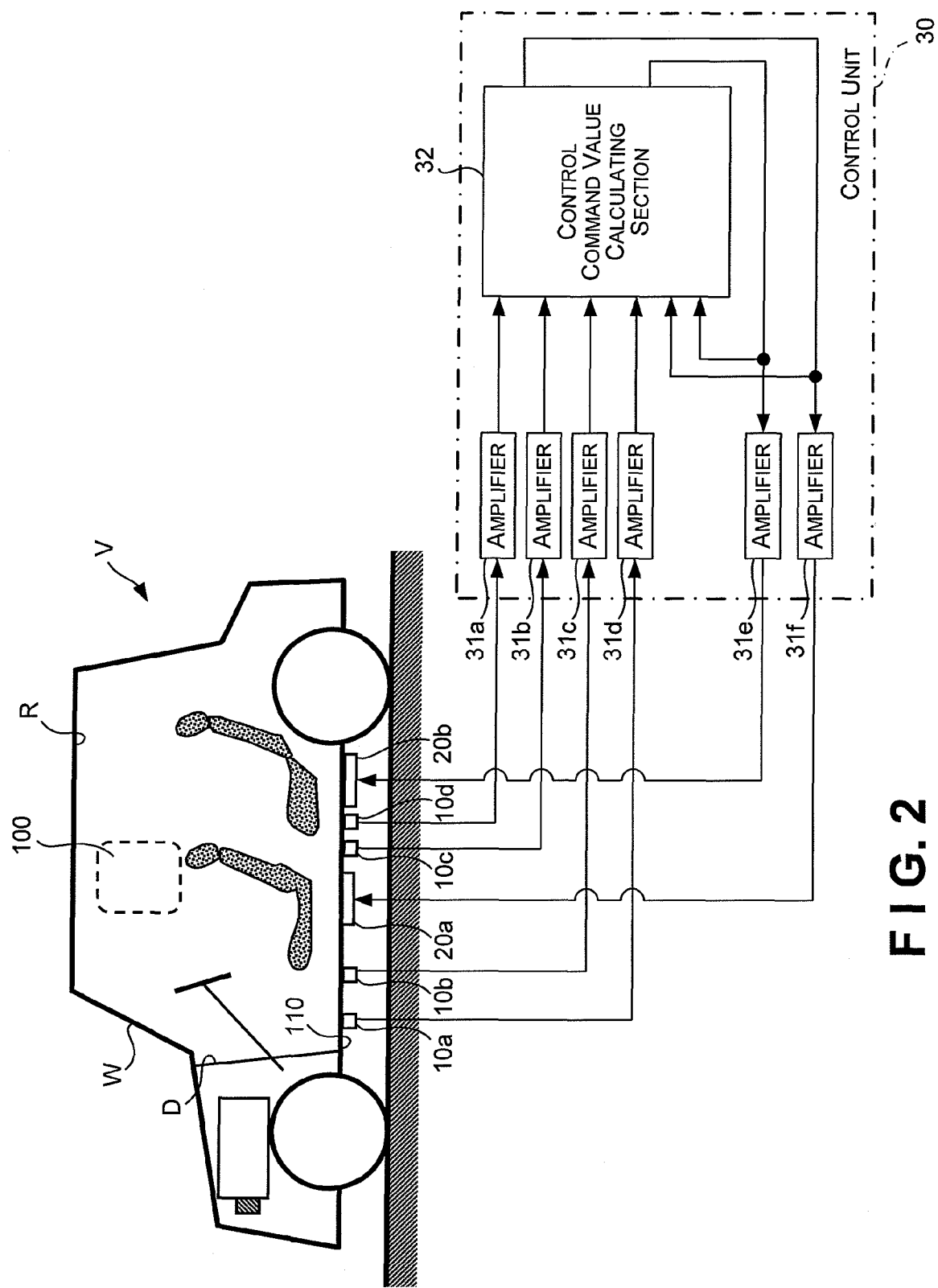
FIG. 2 is a simplified schematic diagram of a noise control apparatus in accordance with the first embodiment of the present invention.

Referring initially to FIGS. 1 and 2, a noise control apparatus having a noise estimating device is illustrated in accordance with a first embodiment of the present invention. FIG. 1 is a schematic diagram illustrating the main propagation paths of road noise and vibration in a vehicle body due unevenness of a road surface in accordance. FIG. 2 is a simplified schematic diagram of the noise control apparatus having the noise estimating device.

Generally speaking, causes for noise penetrating from outside of the vehicle to a vehicle interior space (e.g., a passenger compartment) include, for example, engine noise that results from engine vibration, noise transmitted from the tires of the vehicle caused by unevenness of the road surface during travel (referred as "road noise"), wind noise that is produced by the flow of air during travel. In the first embodiment of the present invention, the noise control apparatus is configured primarily to reduce the road noise in the vehicle interior space. More specifically, the noise control apparatus includes the noise estimating device configured to estimate the road noise within the vehicle interior space based not solely on vehicle vibrations, but also based on estimated external vibrations entering the vehicle body. Therefore, with the present invention, the noise within the vehicle interior space can be accurately estimated.

As shown in FIG. 1, a vehicle V includes a plurality of tires 200, each of which is rotatably coupled to a vehicle body about an axle 120. Moreover, each of the tires 200 is coupled to a beam member 140 of a vehicle body having a high rigidity via a suspension member 130 as shown in FIG. 1. The vehicle body further includes a floor panel 110 that is enclosed by the beam member 140. The floor panel 110 is a plate shaped member that has a relatively lower rigidity.

In such arrangement of the vehicle V, vibrations, which are the primary components of road noise propagated from each of the tires 200 and entering the vehicle body, are initially conveyed from an attachment part (not shown) of the axle 120 and the suspension member 130 and then to the beam member 140. Then, the vibrations propagate to the floor panel 110 thereby causing the floor panel 110 to vibrate.

Moreover, the vibrations of the floor panel 110 cause a vibration of the air within the vehicle interior space (e.g., a passenger compartment). The road noise can then be heard in a prescribed reference region or space within the vehicle interior space (referred as a control space 100) due to the resulting resonance phenomena within the vehicle.

Noise is also produced by the vibration of a roof panel R (FIG. 2), a window glass W (FIG. 2), and other parts of the vehicle V other than the floor panel 110. However, the majority of the road noise is conveyed primarily from the attachment part of the suspension member 130 coupled to each of the tires 200 and is caused by vibrations of the floor panel 110. Therefore, if noise control can be performed so as to cancel out the road noise caused by the vibrations of the floor panel 110, then road noise within the vehicle interior space can be substantially reduced.

The vehicle V is further provided with a plurality of sensors (acceleration sensors) 10a to 10d (as described in more detail below) and a pair of actuators (e.g., piezo-actuators) 20a and 20b (as described in more detail below) that are attached to the floor panel 110. The noise estimating device of the first embodiment is configured to estimate the noise within the vehicle interior space (using the control space 100 as a reference region) based on the relationship between output signals from the sensors 10a to 10d and vibrations entering into the vehicle V. Then, the noise control apparatus of the first embodiment is configured to generate control command values based on the estimated noise and to drive the actuators 20a and 20b to produce control noise based on the control command values so that the road noise within the vehicle interior space is cancelled out by the control noise produced by the actuators 20a and 20b.

More specifically, as shown in FIG. 2, the noise control apparatus of the first embodiment basically includes the acceleration sensors 10a to 10d, the piezo-actuators (piezoelectric actuators) 20a and 20d, and a control unit 30. The acceleration sensors 10a to 10d are positioned in a plurality of prescribed locations on the floor panel 110, and configured and arranged to detect the vibrations of the floor panel 110. The control unit 30 is configured to calculate control command values for reducing the noise within the vehicle based on the signals obtained by the acceleration sensors 10a to 10d. The piezo-actuators 20a and 20b are configured and arranged to cause vibration in the floor panel 110 according to the control command values output from the control unit 30.

In the first embodiment of the present invention, the noise estimating device is configured to estimate the noise within the control space 100 based on the output signals from the acceleration sensors 10a to 10d instead of using microphones as sensors. More specifically, in the first embodiment, the noise control apparatus is configured to control the road noise caused by the vibrations of the floor panel 110 by using the acceleration sensors 10a to 10d that are positioned on the floor panel 110. The floor panel 110 is selected as the mounting location for the acceleration sensors 10a to 10d because of the high coherence between the vibrations of the floor panel 110 and the noise within the vehicle V.

Generally, the number of acceleration sensors 10a to 10d needs to be greater than the number of vibration sources. In the first embodiment, four acceleration sensors 10a to 10d and two actuators 20a and 20b are provided. Of course, it will be apparent to those skilled in the art from this disclosure that the number and locations of the acceleration sensors and the number and locations of the actuators are not limited to the arrangements of the acceleration sensors 10a to 10d and the actuators 20a to 20b illustrated in FIGS. 1 and 2. For example, the piezo-actuators are preferably provided in appropriate locations and in adequate numbers to reduce the noise in the control space 100. Moreover, the specific numbers and locations of the acceleration sensors 10a to 10d are preferably determined so that a coherence $C_{xy}(\omega)$ between the sound pressure of the noise in the control space 100 and the acceleration detected by each of the acceleration sensors 10a to 10d has a value that is adequately high (e.g., 0.9 or more), as calculated in Equation 1.

$$C_{xy}(\omega) = \left| \frac{P_{xy}^H(\omega) P_{xx}^{-1}(\omega) P_{xy}(\omega)}{P_{yy}(\omega)} \right|. \quad \text{Equation 1}$$

The coherence indicates the correlation between signals. When the coherence is high, the information necessary for estimating the noise will be sufficiently contained in the signals detected by the acceleration sensors 10a to 10d.

Since the noise control apparatus is configured to set all of the noise that originates from the floor panel 110 as the target of control, the wind noise produced by airflow along the bottom of the vehicle body and a portion of the engine noise can also be controlled in the same manner as in the present invention. However, the scope of the effect of the present invention is not limited to reducing only the noise due to the vibration of the floor panel 110. When the present invention is employed with, e.g., a dash panel D, the front windshield W, or the roof panel R of the vehicle V as shown in FIG. 2, the same effects can be obtained relative to these noise sources, which produce noise within the vehicle interior space by the similar mechanism (e.g., the vibration of the vehicle body is caused by input of external vibrations).

The control unit 30 preferably includes a microcomputer with a noise control program that controls the piezo-actuators 20a and 20b as discussed below. The control unit 30 can also include other conventional components such as an input interface circuit, an output interface circuit, and storage devices such as a ROM (Read Only Memory) device and a RAM (Random Access Memory) device. The memory circuit stores processing results and control programs such as ones for noise estimating operation that are run by the processor circuit. The control unit 30 is operatively coupled to the acceleration sensors 10a to 10d and the piezo-actuators 20a and 20b in a conventional manner. The internal RAM of the control unit 30 stores statuses of operational flags and various control data. The internal ROM of the control unit 30 stores the programs and data for various operations. The control unit 30 is capable of selectively controlling any of the components of the control system in accordance with the control program. It will be apparent to those skilled in the art from this disclosure that the precise structure and algorithms for control unit 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

More specifically, the control unit 30 is configured to receive signals indicative of the accelerations (vibrations) from the acceleration sensors 10a to 10d. The control unit 30 is further configured to output control command values to the piezo-actuators 20a and 20b.

As shown in FIG. 2, the control unit 30 further includes a plurality of amplifiers 31a to 31f and a control command value calculating section 32. The amplifiers 31a to 31f are configured to amplify signals input therein. The amplifiers 31a to 31f are also configured to convert between charge and voltage when the acceleration sensors 10a to 10d are arranged as so-called charge accelerometers. The control command value calculating section 32 is configured to calculate the control command values for reducing the noise within the vehicle interior space based on the signals output from the acceleration sensors 10a to 10d and amplified by the amplifiers 31a to 31d, and to output the control command values to the piezo-actuators 20a and 20b via the amplifiers 30e and 30f.

Figure 3:
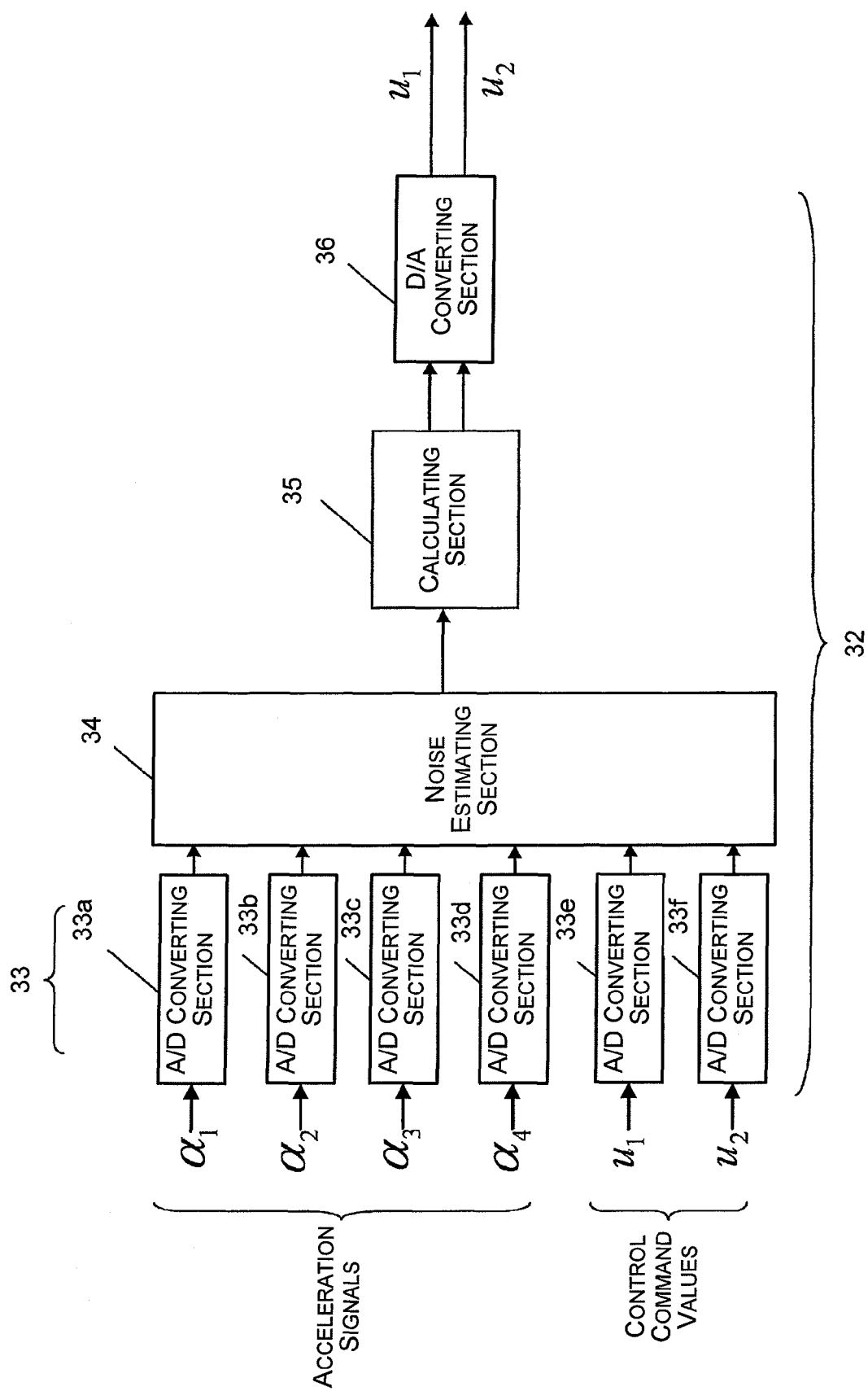
FIG. 3 is a schematic block diagram illustrating an internal configuration of a control command value calculating section of the noise control apparatus in accordance with the first embodiment of the present invention.

Referring now to FIG. 3, the control command value calculating section 32 will be explained in more detail. FIG. 3 is a schematic block diagram of an internal structure of the control command value calculating section 32. The control command value calculating section 32 in the first embodiment is preferably implemented by the CPU.

As shown in FIG. 3, the control command value calculating section 32 includes an analog/digital (A/D) converter unit 33 including a plurality of A/D converting sections 33a to 33e, a noise estimating section 34, a calculating section 35, and a digital/analog (D/A) converting section 36. The noise estimating section 34 and the acceleration sensors 10a to 10d preferably constitute a noise estimating device of the first embodiment of the present invention.

The control command value calculating section 32 is configured to calculate control command values $u_1$ and $u_2$ so that the noise in the control space 100 is reduced using acceleration signals $\alpha_1$, $\alpha_2$, $\alpha_3$ and $\alpha_4$ output by the acceleration sensors 10a, 10b, 10c and 10d, respectively, and the signals (the control command values $u_1$ and $u_2$) that have been input to the piezo-actuators 20a and 20b.

The A/D converting sections 33a, 33b, 33c and 33d are configured to convert the analog acceleration signals $\alpha_1$, $\alpha_2$, $\alpha_3$ and $\alpha_4$, which are input from the acceleration sensors 10a, 10b, 10c and 10d, respectively into digital signals. The A/D converting sections 33e and 33f are configured to convert the analog control command values $u_1$ and $u_2$ calculated in the previous cycle into digital signals.

The D/A converting section 36 is configured to convert the digital control command values calculated in the calculating section 35 into analog signals (control command values $u_1$ and $u_2$).

The noise estimating section 34 is configured to estimate an estimated noise SPL_est in the control space 100 using the acceleration signals α1, α2, α3 and α4 input from the acceleration sensors 10a, 10b, 10c and 10d, respectively, and the control command values $u_1$ and $u_2$ calculated in the processing cycle in the preceding step.

Then, the calculating section 35 is configured to calculate the control command values $u_1$ and $u_2$, which are to be sent to the piezo-actuators 20a and 20b to reduce the noise in the control space 100, using the estimated noise SPL_est.

Figure 4:
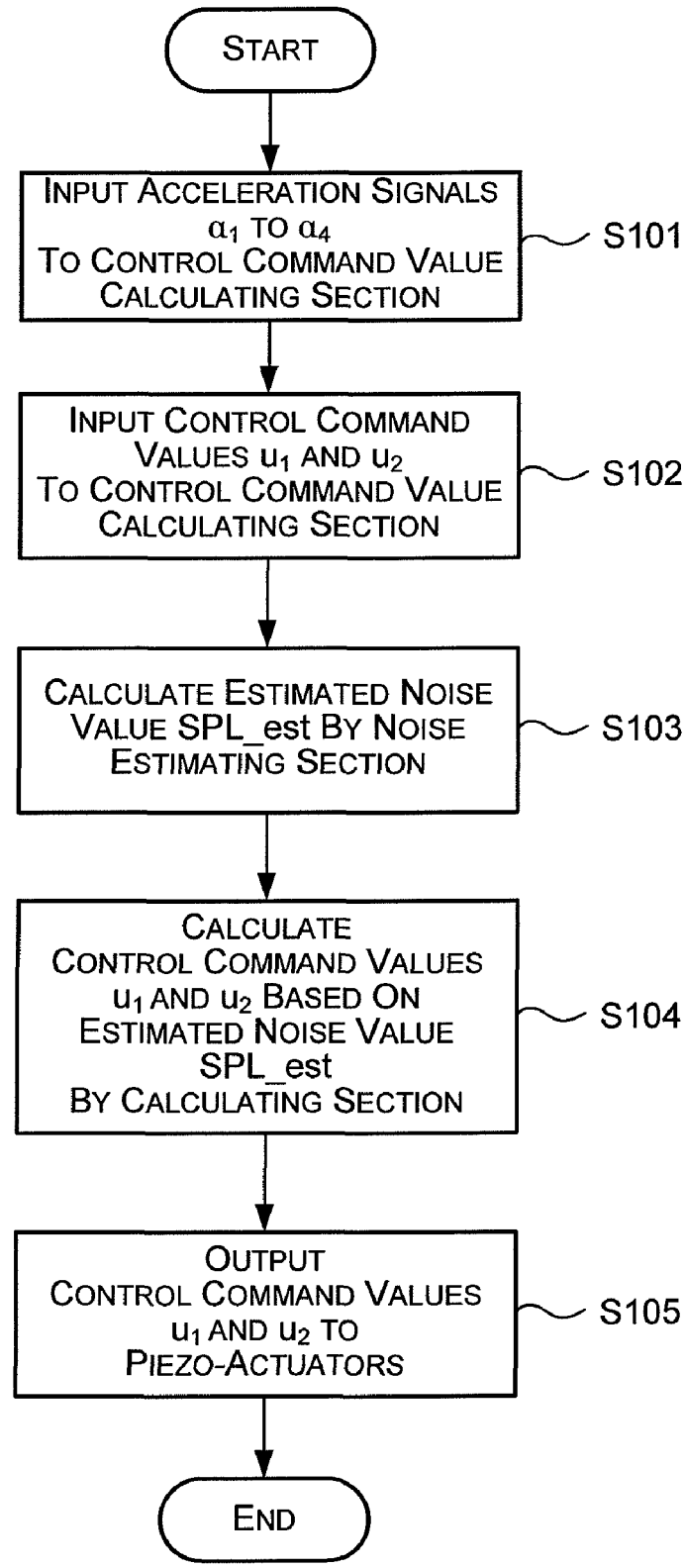
FIG. 4 is a flowchart of a control process executed by a control unit of the noise control apparatus to control the noise in accordance with the first embodiment of the present invention.

Referring now to FIG. 4, a control process executed by the control unit 30 to control the noise in the vehicle interior space will be explained.

In step S101 of FIG. 4, the control command value calculating section 32 is configured receive the acceleration signals α1, α2, α3 and α4 output from the acceleration sensors 10a, 10b, 10c and 10d, respectively. Then, the A/D converting sections 33a, 33b, 33c and 33d are configured to covert the analog acceleration signals α1, α2, α3 and α4, respectively, into digital signals and output them to the noise estimating section 34.

In step S102, the control command values $u_1$ and $u_2$ calculated in the previous control cycle are input into the A/D converting sections 33e and 33f, respectively. The A/D converting sections 33e and 33f are configured to convert the analog control command values $u_1$ and $u_2$ into digital signals and output them to the noise estimating section 34.

In step S103, the noise estimating section 34 is configured to execute a noise estimating process to estimate the noise value (the estimated noise SPL_est) of the control space 100 based on the signals obtained in S101 and S102. The noise estimating process executed by the noise estimating section 34 in step S103 will be explained in more detail with reference to FIGS. 5 and 6.

In step S104, the calculating section 35 is configured to calculate the control command values $u_1$ and $u_2$ for reducing the noise in the control space 100 based on the estimated noise SPL_est estimated in S103.

In step S105, the D/A converting section 36 is configured to receive the control command values $u_1$ and $u_2$ calculated in S104 and to convert the digital control command values $u_1$ and $u_2$ into analog signals. Then, the D/A converting section 36 is configured to output the analog control command values $u_1$ and $u_2$ to the piezo-actuators 20a and 20b, respectively. At the same time, the analog control command values $u_1$ and $u_2$ are also output to the A/D converting sections 33e and 33f, respectively, to be used in the next control cycle.

The calculating section 35 may be designed using any type of feedback control. For example, in the first embodiment of the present invention, the calculating section 35 is configured to use a design employing H∞ control as explained below.

Transfer characteristics $G_p(s)$ between the input voltage of the piezo-actuators 20a and 20b and the noise will be used as a model of the system. Here, the value s is the Laplace-transform variable. A controller that is configured to reduce the noise with respect to the transfer characteristic $G_p(s)$ can be designed by using a conventional design method such as the one described in "D. McFarlane and K. Glover, "A Loop Shaping Design Procedure Using H∞ Synthesis," *IEEE Transactions on Automatic Control*. Vol. 37, No. 6, June 1992, pp. 759-769."

More specifically, in this method, a controller $C_\infty(s)$ is designed to satisfy an evaluation formula (Equation 2) below.

$$\left\| \begin{bmatrix} I \\ C_\infty(s) \end{bmatrix} (I - G_s(s)C_\infty(s))^{-1} \tilde{M}_s^{-1}(s) \right\|_\infty \leq \varepsilon^{-1} \qquad \text{Equation 2}$$

In Equation 2, the function $G_s(s)$ designates the transfer characteristics (transfer function) weighted by weighting functions $W_1(s)$ and $W_2(s)$. In other words, the function $G_s(s)$ is obtained by Equation 3 below.

$$G_s(s) = W_2(s)G_p(s)W_1(s) \qquad \text{Equation 3}$$

Also, in Equation 2, the function $\tilde{M}_s(s)$ is determined by resolving the transfer function $G_s(s)$ in accordance with the normalized convention in Equation 4 below.

$$\begin{cases} G_s(s) = \tilde{M}_s^{-1}(s)\tilde{N}_s(s) \\ \tilde{M}_s(s)\tilde{M}_s^*+ \tilde{N}_s(s)\tilde{N}_s^*(s) = I \end{cases} \qquad \text{Equation 4}$$

Accordingly, a controller C(s) is calculated in Equation 5 below using the controller $C_\infty(s)$ that satisfies the evaluation formula of Equation 2.

$$C(s) = W_1(s)C_\infty(s)W_2(s) \qquad \text{Equation 5}$$

In Equation 2, the constant ε is a parameter that determines the stability margin of the controller C(s) and is usually recommended to be 0.2 to 0.3. When implemented by the CPU, the controller C(s) should be, for example, discredited via bilinear transformation and implemented as an IIR filter.

Figure 5:
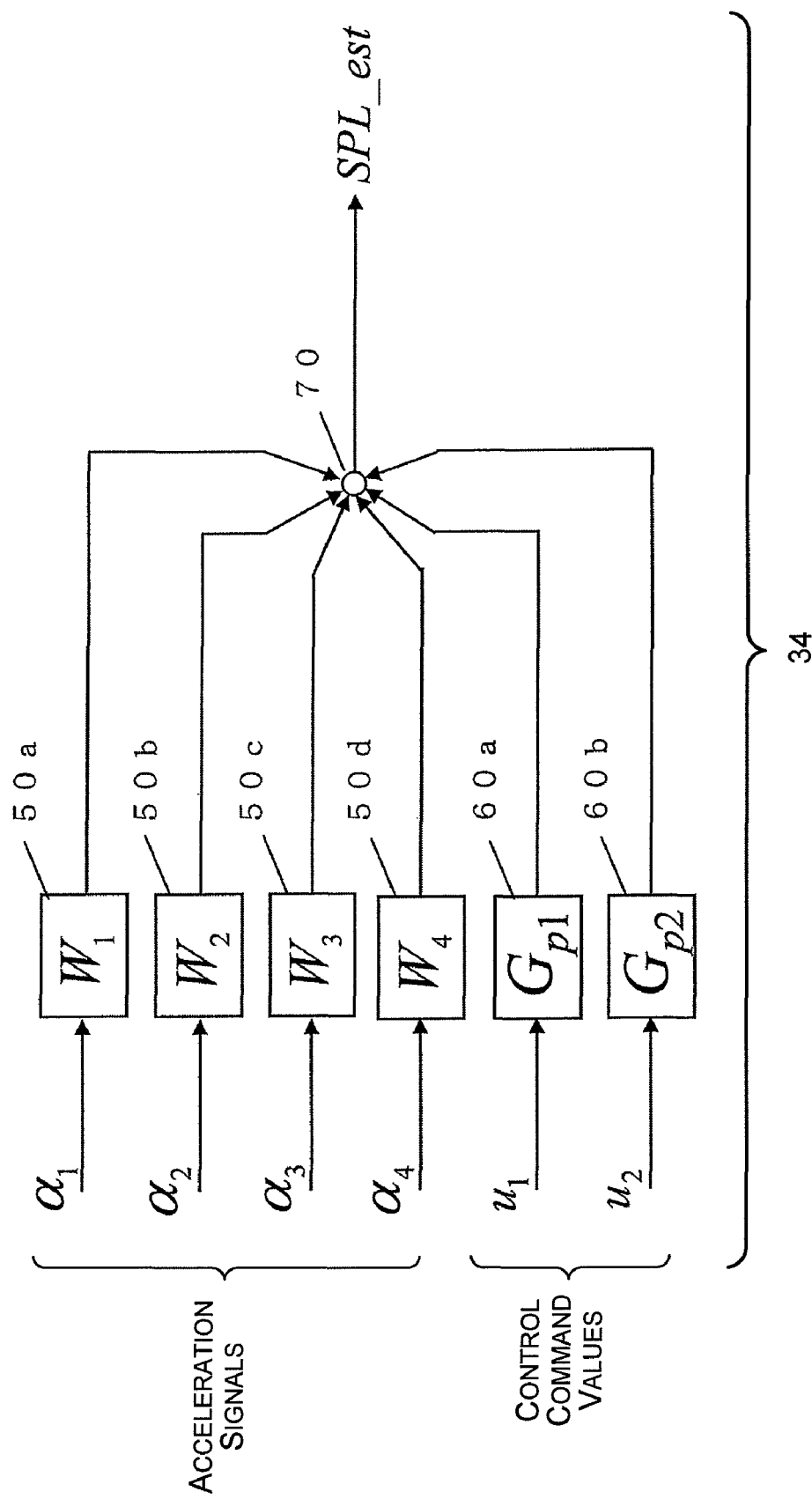
FIG. 5 is a schematic block diagram of a noise estimating section in accordance with the first embodiment of the present invention.

Referring now to FIG. 5, the configuration of the noise estimating section 34 will be explained in more detail.

As shown in FIG. 5, the noise estimating section 34 includes a plurality of transfer characteristics blocks 50a, 50b, 50c and 50d, a pair of characteristics blocks 60a and 60b and an adder 70. The acceleration signals α1, α2, α3 and α4 that are input to the noise estimating section 34 as digital signals are input to the transfer characteristics blocks 50a, 50b, 50c and 50d, respectively. Also, the control command values u1 and u2 that are input to the noise estimating section 34 as digital signals are input to the transfer characteristics blocks 60a and 60b, respectively.

The transfer characteristics blocks 50a to 50d are configured to smooth the acceleration signals α1, α2, α3 and α4 in order to express the noise that has penetrated the control space 100 from outside of the vehicle as a sum of the signals. The transfer characteristics blocks 50a to 50d are designed so that the sum of the signals after processing is the estimated value of the noise (estimated noise SPL_est) that has penetrated from outside the vehicle.

The transfer characteristics blocks 60a and 60b designate the transfer characteristics between the input voltages for the piezo-actuators 20a and 20b, respectively, and the sound pressure in the control space 100. The transfer characteristics blocks 60a and 60b can be obtained by inputting white noise or impulse signals to the respective piezo-actuators 20a and 20b and using the resulting input signals and the sound-pressure signals in the control space 100 to perform system identification. The conventional methods such as the one described in "Structural Dynamical Toolbox," which is a toolbox of the control-design tool MATLAB, or the subspace identification method described in a reference "Adachi, *Seigyo no Tame no Shisutemu Doutei* (*System Identification for Control Purposes*), Tokyo Denki University Press, 1996" may be used for performing system identification.

The noise estimating section 34 is configured to estimate the value of the noise that will be created in the control space 100 by the vibration (sound) produced by the piezo-actuators 20a and 20b by multiplying the input voltages of the piezo-actuators 20a and 20b by the transfer characteristics blocks 60a and 60b, respectively, and adding the results together.

Thus, the noise estimating section 34 is configured to add the acceleration signals α1, α2, α3 and α4 that were smoothed or shaped by the transfer characteristics blocks 50a, 50b, 50c and 50d, respectively, and the control command values u1 and u2 that were calculated by the transfer characteristics blocks 60a and 60b in the adder 70 to obtain the estimated noise SPL_est in the control space 100 as shown in FIG. 5. Accordingly, the estimated noise SPL_est is formed by the vibrations penetrating from outside the vehicle based on the acceleration signals α1, α2, α3 and α4 and the vibrations generated by the piezo-actuators 20a and 20b based on the control command values $u_1$ and $u_2$.

Figure 6:
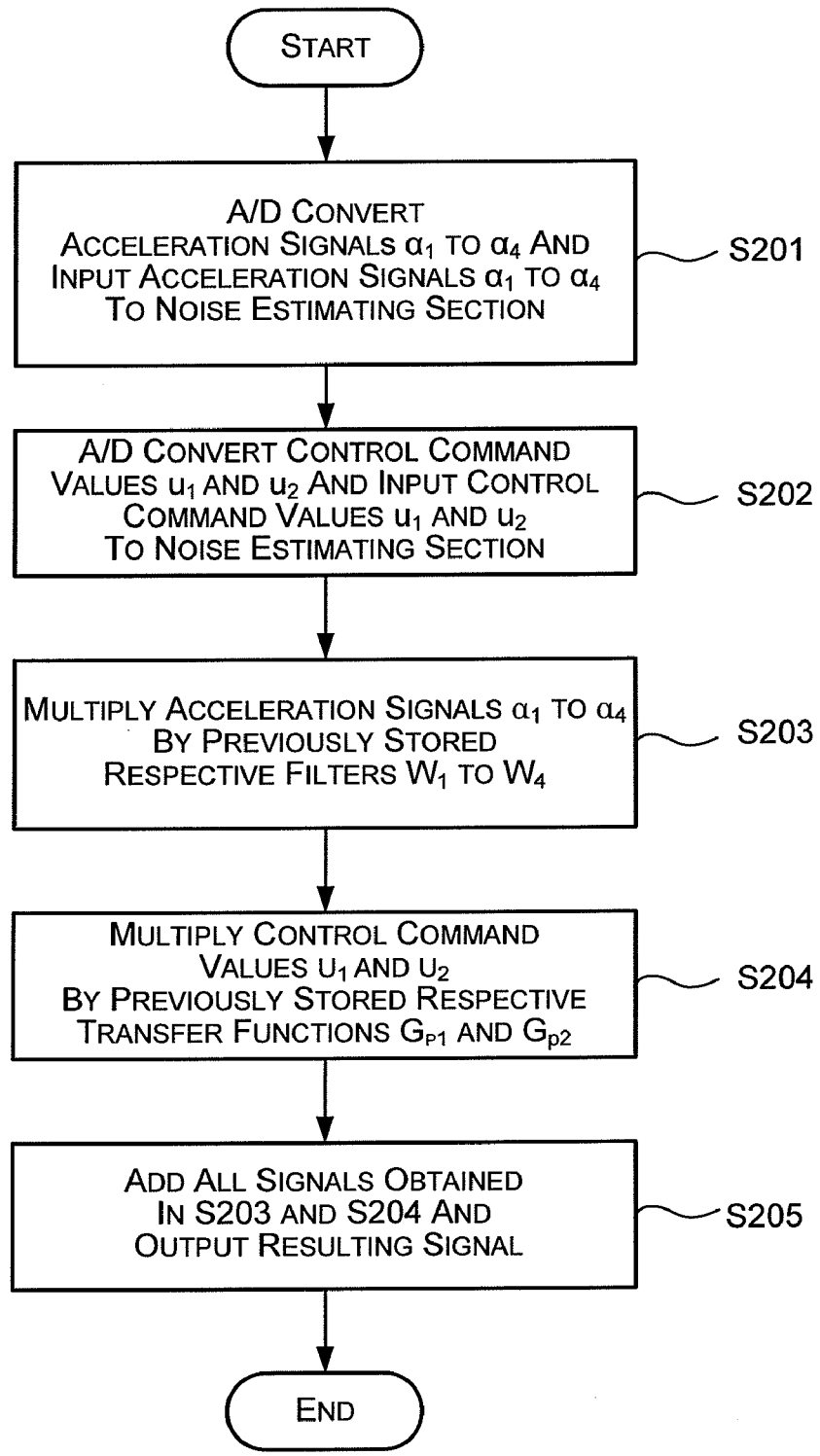
FIG. 6 is a flowchart of a control process executed by the noise estimating section in accordance with the first embodiment of the present invention.

FIG. 6 is a flowchart illustrating a control process executed by the noise estimating section 34 to calculate the estimated noise SPL_est.

In step S201 of FIG. 6, the noise estimating section 34 is configured to receive the acceleration signals α1, α2, α3 and α4 of the acceleration sensors 10a, 10b, 10c and 10d, respectively, which have been A/D converted by the A/D converting sections 33a, 33b, 33c and 33d.

In step S202, the noise estimating section 34 is configured to receive the control command values $u_1$ and $u_2$ calculated in the previous control cycle, which have been A/D converted by the A/D converting sections 33e and 33f.

In step S203, the noise estimating section 34 is configured to multiply the acceleration signals α1, α2, α3 and α4 received in S201 in the respective transfer characteristics blocks 50a, 50b, 50c and 50d by transfer characteristics filters $W_1$, $W_2$, $W_3$ and $W_4$, respectively. The filters $W_1$, $W_2$, $W_3$ and $W_4$ are stored in the control unit 30 in advance. The method for determining the filters $W_1$, $W_2$, $W_3$ and $W_4$ will be explained in more detail below with reference to FIGS. 7 and 8.

In step S204, the noise estimating section 34 is configured to multiply the control command values $u_1$ and $u_2$ received in S202 in the transfer characteristic blocks 60a and 60b by transfer functions $G_{p1}$ and $G_{p2}$, respectively. The transfer function $G_{p1}$ designates the transfer characteristic between the input voltage of the piezo-actuator 20a and the sound pressure in the control space 100, and the transfer function $G_{p2}$ designates the transfer characteristic between the input voltage of the piezo-actuator 20b and the sound pressure in the control space 100. The transfer functions $G_{p1}$ and $G_{p2}$ are stored in the control unit 30 in advance.

In other words, the transfer functions $G_{p1}$ and $G_{p2}$ in the first embodiment are preferably established beforehand as IIR filters by an inverse Z transformation after identification of the transfer characteristics between the input voltages of the piezo-actuators 20*a* and 20*b* and the noise as discrete-time systems.

In step S205, all of the signals obtained in steps S203 and S204 are added together in the adder 70, and the resulting signal is output to the calculating section 35 of the control command value calculating section 32.

Figure 7:
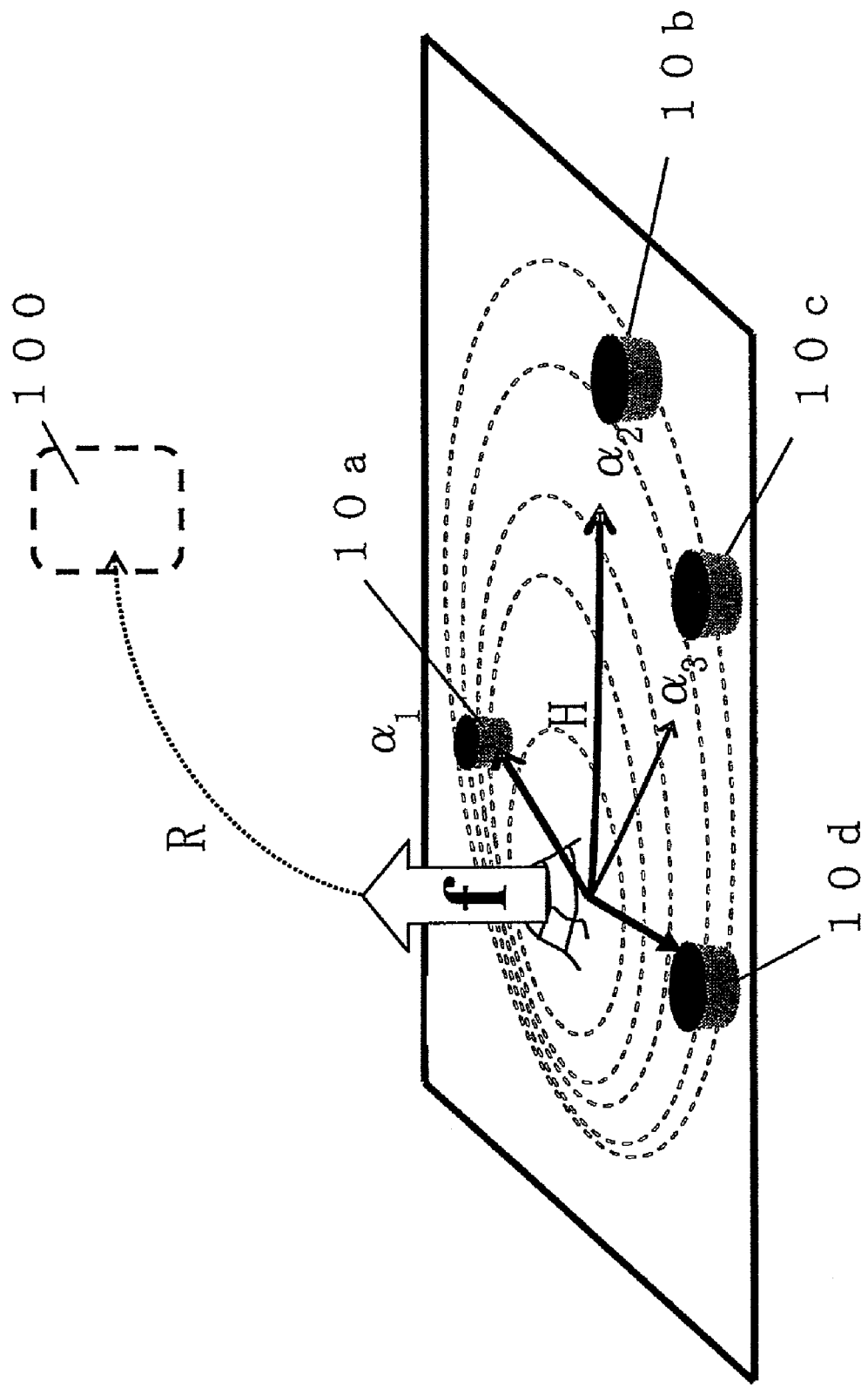
FIG. 7 is a schematic diagram illustrating the relationships between the acceleration, the noise within the vehicle, and the vibrations input to the vehicle body from the outside in accordance with the first embodiment of the present invention.

Referring now to FIGS. 7 and 8, a method for determining the filters $W_1$, $W_2$, $W_3$ and $W_4$ used in the transfer characteristics blocks 50*a*, 50*b*, 50*c* and 50*d* will be described.

FIG. 7 is a schematic diagram illustrating the relationships between the external input vibration f (the source of vibration) that is input to the vehicle body, the acceleration signals $\alpha_1$, $\alpha_2$, $\alpha_3$ and $\alpha_4$ (the vibrations detected by the acceleration sensors 10*a*, 10*b*, 10*c* and 10*d*), and the noise within the vehicle interior space (i.e., the control space 100 as a reference region). When the external input vibration f is input to the vehicle body, the vibration is dispersed within the vehicle and a portion is conveyed to the acceleration sensors 10*a*, 10*b*, 10*c*, 10*d* through the transfer characteristics H(s) (indicated as "H" in FIG. 7) between the input location (vibration input location) and the acceleration sensors 10*a*, 10*b*, 10*c* and 10*d*. The accelerations detected by the acceleration sensors 10*a*, 10*b*, 10*c* and 10*d* are output as the acceleration signals $\alpha_1$, $\alpha_2$, $\alpha_3$ and $\alpha_4$, respectively.

The external input vibration f propagates through the air within the vehicle and becomes noise in the control space 100. R(s) designates the transfer characteristics of air propagation between the control space 100 and the location (vibration input location) where the external input vibration f enters the vehicle body (indicated as "R" in FIG. 7).

In the following calculations, the vehicle noise in the control space 100 is designated SPL, and the Laplace transform of the signal SPL is designated $SPL_L(s)$. The signal of the external input vibration f at this point is designated f, and the Laplace transform of the signal f is $f_L(s)$. Likewise, the Laplace transforms of the acceleration signals $\alpha_1$, $\alpha_2$, $\alpha_3$ and $\alpha_4$ are designated $\alpha_{L1}(s)$, $\alpha_{L2}(s)$, $\alpha_{L3}(s)$ and $\alpha_{L4}(s)$, respectively. In such case, the relationships between the signals are expressed by the equations below.

$$SPL_L(s) = R(s) f_L(s) \quad \text{Equation 6}$$

$$\begin{bmatrix} \alpha_{L1}(s) \\ \alpha_{L2}(s) \\ \alpha_{L3}(s) \\ \alpha_{L4}(s) \end{bmatrix} = H(s) f(s) \quad \text{Equation 7}$$

In Equation 7, the matrix H is a matrix of four rows and one column of the elements that compose the transfer characteristics. Using the relationship between Equation 6 and Equation 7 above, the relationship between the external input vibration f and the noise SPL within the vehicle can be expressed as the acceleration signals $\alpha_1$ to $\alpha_4$ detected by the acceleration sensors 10*a* to 10*d*. In order to arrive at this relationship, Equation 7 is solved for f and substituted into Equation 6 to yield Equation 8.

$$SPL = RH^+ \begin{bmatrix} \alpha_1 \\ \alpha_2 \\ \alpha_3 \\ \alpha_4 \end{bmatrix} \quad \text{Equation 8}$$

The function $H^+$ in this case designates an inverse function of the transfer characteristics matrix H(s). Since the matrix H is not a square matrix but a rectangular matrix, the inverse matrix of the matrix H cannot be calculated. Therefore, the pseudo-inverse matrix $H^+$ is calculated by Equation 9 below.

$$H^+ = (H^T H)^{-1} H^T \quad \text{Equation 9}$$

In Equation 9, the necessary condition for calculating the pseudo-inverse matrix $H^+$ is that the following Equation 10 is true when the number of rows of the matrix H is $m_H$ and the number of columns of H is $n_H$.

$$m_H \geq n_H \quad \text{Equation 10}$$

The matrix $RH^+$ in Equation 8 has one row and four columns, and thus the elements in the matrix $RH^+$ can be expressed as in Equation 11 below.

$$RH^+ = [W_1 \, W_2 \, W_3 \, W_4] \quad \text{Equation 11}$$

Therefore, Equation 8 can be transformed to Equation 12 below.

$$SPL = [W_1 \, W_2 \, W_3 \, W_4] \begin{bmatrix} \alpha_1 \\ \alpha_2 \\ \alpha_3 \\ \alpha_4 \end{bmatrix} \quad \text{Equation 12}$$

$$= W_1 \alpha_1 + W_2 \alpha_2 + W_3 \alpha_3 + W_4 \alpha_4$$

The filters $W_1$ to $W_4$ appeared in Equation 12 are set as the transfer characteristics block 50*a* to 50*d* shown in FIG. 7. The transfer characteristics blocks 50*a* to 50*d* (W) for the acceleration signals $\alpha_1$ to $\alpha_4$ are therefore determined by the column vectors shown in Equation 13 below $$W = RH^+ \quad \text{Equation 13}$$

$$= R(H^T H)^{-1} H^T$$

FIG. 8 is a flowchart illustrating a control process for determining the filters $W_1$ to $W_4$ used in the transfer characteristics blocks 50*a* to 50*d* as explained above.

In step S301 of FIG. 8, the transfer characteristics R and the transfer characteristics H are calculated. The transfer characteristics R and the transfer characteristics H may also be stored beforehand as calculation data.

In step S302, the function $H^+ = (H^T \cdot H)^{-1} H^T$ (Equation 9) is calculated based on the transfer characteristic H.

In step S303, the filters $W_1$ to $W_4$ in the transfer characteristics blocks 50*a* to 50*d* are calculated as the column vectors in $W = RH^+$ (Equation 13).

Figure 9:
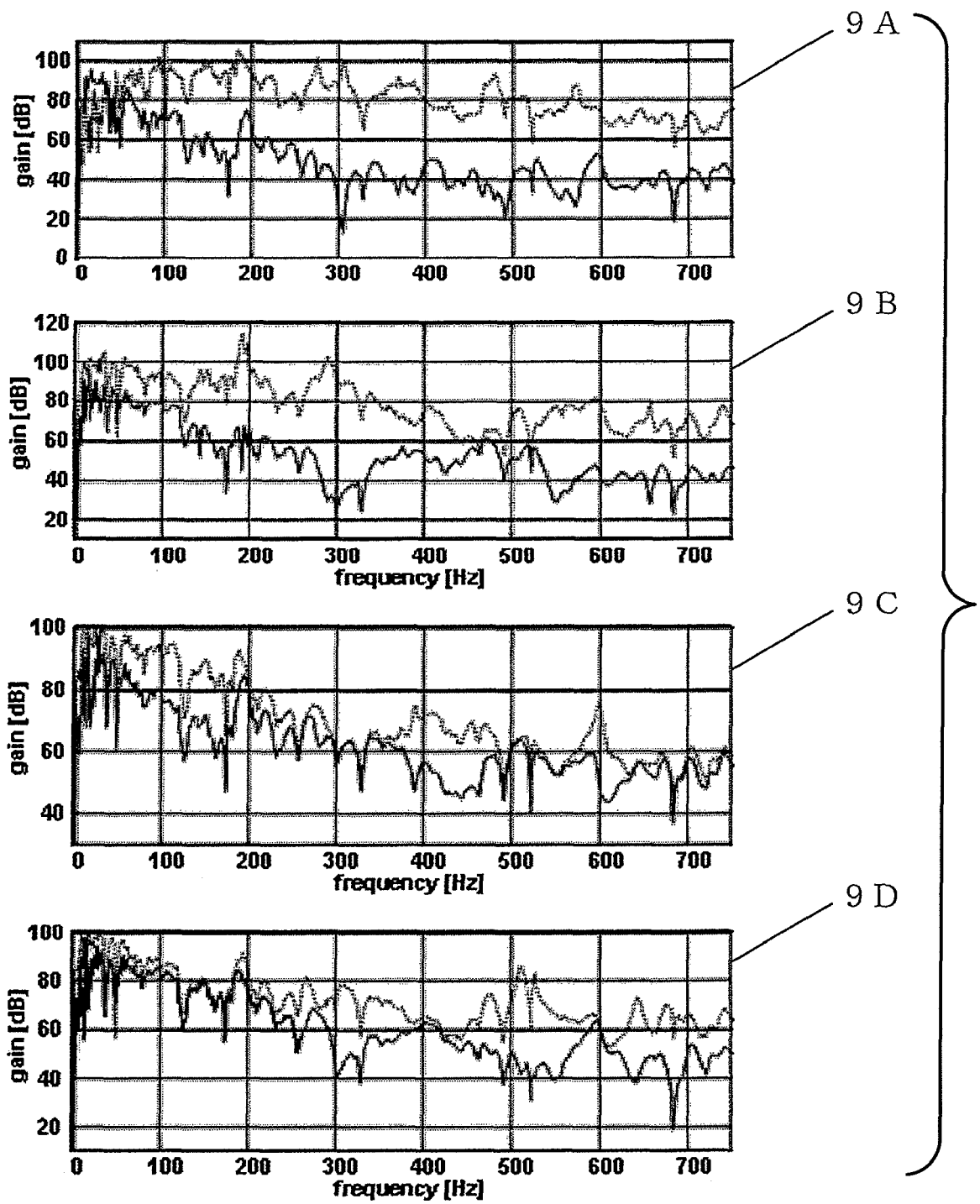
FIG. 9 is a plurality of diagrams illustrating examples of the frequency response of the transfer characteristics in accordance with the first embodiment of the present invention.

Examples of the frequency response of the transfer characteristics 50 resulting from the method above are shown in FIG. 9.

FIG. 9 is a plurality of diagrams illustrating examples of the frequency response of the transfer characteristics in accordance with the first embodiment of the present invention. More specifically, the diagrams 9A to 9D in FIG. 9 correspond to the acceleration sensors 10*a* to 10*d*, respectively.

The dotted lines in the diagrams 9A to 9D in FIG. 9 designate the transfer characteristics between the acceleration signals ($\alpha_1$ to $\alpha_4$) of the acceleration sensors 10*a* to 10*d* and the noise in the control space 100. The solid lines designate the characteristics of the functions resulting from multiplying these transfer characteristics by the transfer characteristics blocks 50a to 50d (the filters $W_1$ to $W_4$), respectively, that were calculated using Equation 13. When the dotted lines and the solid lines have similar characteristics in a given frequency range, the corresponding transfer characteristics block 50a, 50b, 50c or 50d is heavily weighted for the corresponding acceleration sensor 10a, 10b, 10c or 10d.

For example, in the vicinity of 300 Hz in the diagrams 9A to 9D in FIG. 9, the diagram 9C displays substantially similar values for the solid line and the dotted line while the solid lines and the dotted lines are separated in the other diagrams 9A, 9B and 9D. Therefore, the acceleration signal of the acceleration sensor 10c is heavily weighted and the acceleration signals of the other acceleration sensors 10a to 10d are lightly weighted in the vicinity of 300 Hz in this case.

Figure 10:
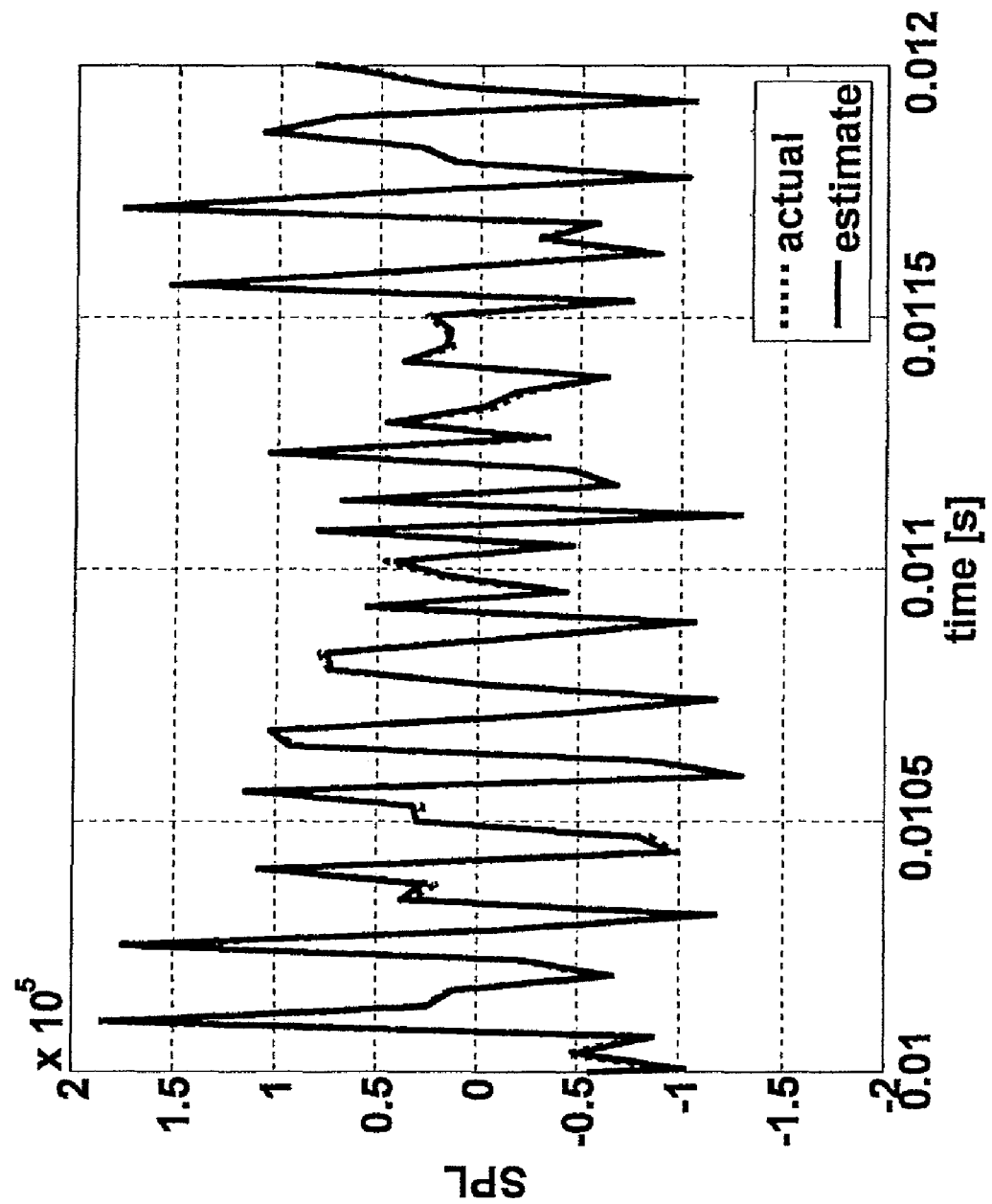
FIG. 10 is a diagram illustrating a comparison between the noise actually measured and the noise estimated by the noise estimating section in accordance with the first embodiment of the present invention.

FIG. 10 is a diagram illustrating a comparison between the noise actually measured and the noise estimated by the noise estimating section 34 using the transfer characteristics blocks 50a to 50d (the filters $W_1$ to $W_4$) as described above in accordance with the first embodiment of the present invention. The dotted line in FIG. 10 is the noise actually measured, and the solid line designates the noise estimated by the noise estimating section 34. As shown in FIG. 10, the noise value can be accurately estimated by using the noise estimating section 34 of the first embodiment. Accordingly, the road noise can be accurately estimated, and the effect of noise reduction can therefore be improved.

Second Embodiment

Figure 11:
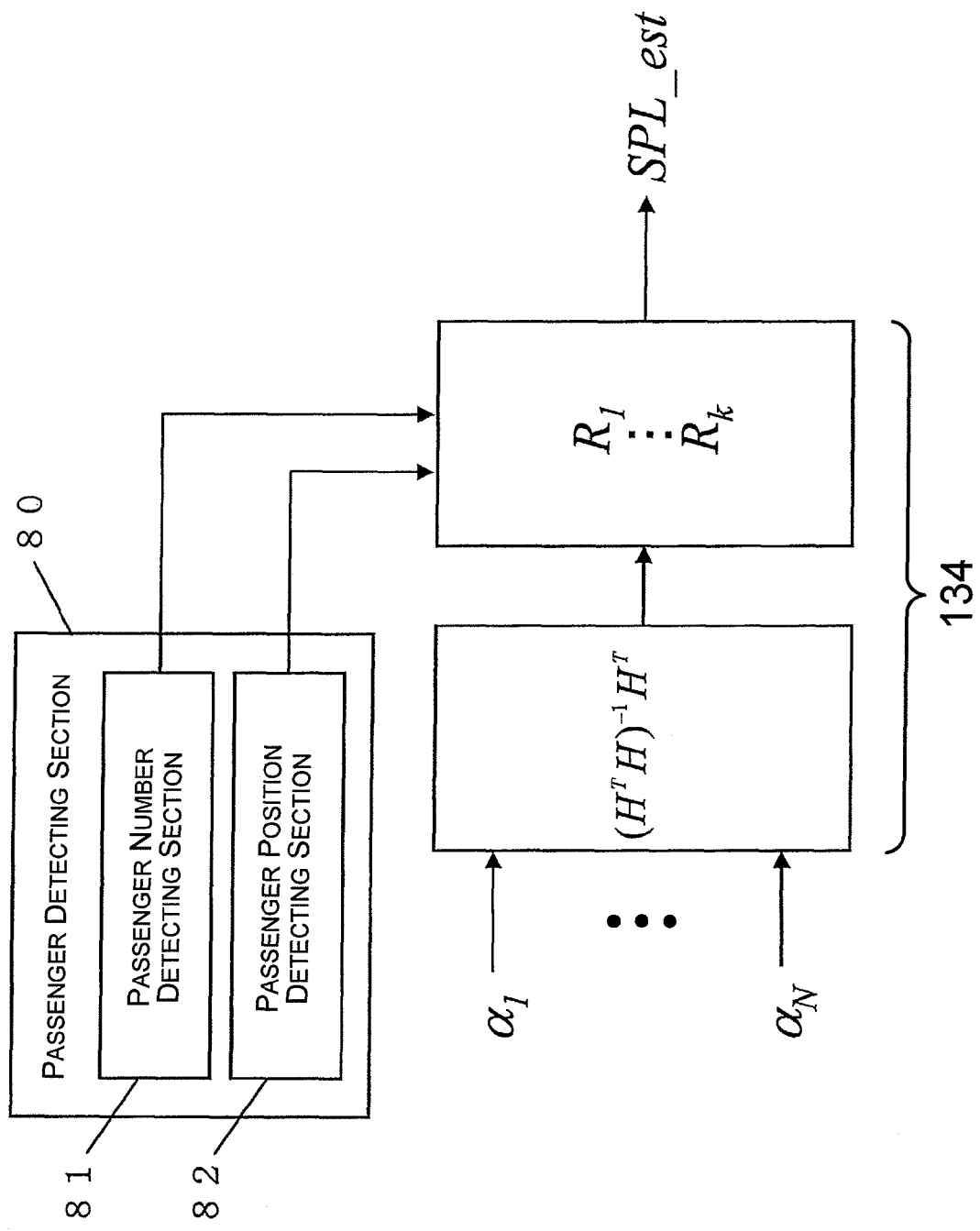
FIG. 11 is a partial block diagram of a noise estimating section in accordance with a second embodiment of the present invention.

Referring now to FIG. 11, a noise estimating device and a noise estimating method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The noise estimating device in accordance with the second embodiment includes a noise estimating section 134 as shown in FIG. 11. The noise estimating section 134 of the second embodiment differs from the noise estimating section 34 of the first embodiment in that, in the second embodiment, the accuracy of noise estimation is further improved by improving the robustness with respect to passengers of the vehicle. Thus, in the second embodiment, the effect of noise reduction can be further improved.

As described in the first embodiment, the transfer characteristics R (FIG. 7) is the transfer characteristics of air propagation between the control space 100 and the location where the external input vibration f enters the vehicle body. The transfer characteristics R are dependent on the propagation characteristics of sound in air, and therefore the transfer characteristics R change according to the number and positions of the passengers in the vehicle interior space.

Accordingly, the noise estimating section 134 of the second embodiment is operatively coupled to a passenger detecting section 80 configured and arranged to detect information regarding passengers in the vehicle. More specifically, the passenger detecting section 80 further includes a passenger number detecting section 81 and a passenger position detecting section as shown in FIG. 11. The passenger number detecting section 81 is configured and arranged to detect the number of passengers. The passenger position detecting section 82 is configured and arranged to detect the positions of the passengers (especially the locations of head parts of the passenger). In the second embodiment, a plurality of different transfer characteristics $R_1$ to $R_k$ is preferably stored in advance, and an appropriate transfer characteristics R is selected (switched) among the plurality of different transfer characteristics $R_1$ to $R_k$ based on at least one of the number of the passengers and the locations of the head parts of the passengers to estimate the noise in the control space 100. Thus, the accuracy of noise estimation can be further improved, and thus, the effect of noise reduction can be further improved. The passenger number detecting section 81 and the passenger position detecting section 82 can be easily implemented by, for example, providing piezoelectric sensors or the like to the inside of the sitting surface of the seats (not shown) of the vehicle and detecting the output values of the sensors.

Third Embodiment

A noise estimating device and a noise estimating method in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the noise estimating device is configured to remove signals in the first and second embodiments other than road noise. Therefore, the accuracy of noise estimation is further improved, and thus, the effect of noise reduction is further improved in the third embodiment.

In the first and second embodiments, the vibrations $\alpha_i$ resulting from road noise is only taken into account in estimating the noise in the control space 100. However, the vibrations (e.g., the acceleration signals $\alpha_1$ to $\alpha_4$) detected by the acceleration sensors 10a to 10d include a component of vibrations other than road noise. More specifically, the accelerations detected by the acceleration sensors 10a to 10d are expressed by the following Equation 14.

$$\alpha_i = \alpha_r + \alpha_j \quad \text{Equation 14}$$

The vibration $\alpha_j$ in Equation 14 is believed to primary consist of vibrations $\alpha_{je}$ resulting from engine vibrations (vibration component corresponding to vibration of the vehicle body cause by driving the engine) and vibrations $\alpha_{jp}$ resulting from the piezo-actuators 20a and 20b. Thus, the accelerations detected by the acceleration sensors 10a to 10d are expressed by the following Equation 15.

$$\alpha_i = \alpha_r + \alpha_{je} + \alpha_{jp} \quad \text{Equation 15}$$

If the transfer characteristics $G_{ie}$ between the engine vibration $f_e$ and the acceleration sensors 10a to 10d are established (measured) beforehand, the vibrations $\alpha_{je}$ can be estimated by measuring the engine vibration $f_e$. Similarly, if the transfer characteristics $G_{ip}$ between the piezo-actuators 20a and 20b and the acceleration sensors 10a to 10d are established (measured) beforehand, the vibrations $\alpha_{jp}$ can be estimated by using the output signals of the piezo-actuators 20a and 20b. Therefore, the vibrations $\alpha_i$ that accurately represents the noise caused by the road noise can be calculated while taking into account the noise other than road noise included in the acceleration detected by the acceleration sensors 10a to 10d. Accordingly, the accuracy of noise estimation can be improved and further reductions in noise can be expected by using the vibrations $\alpha_t$ in the third embodiment.

Fourth Embodiment

Figure 12:
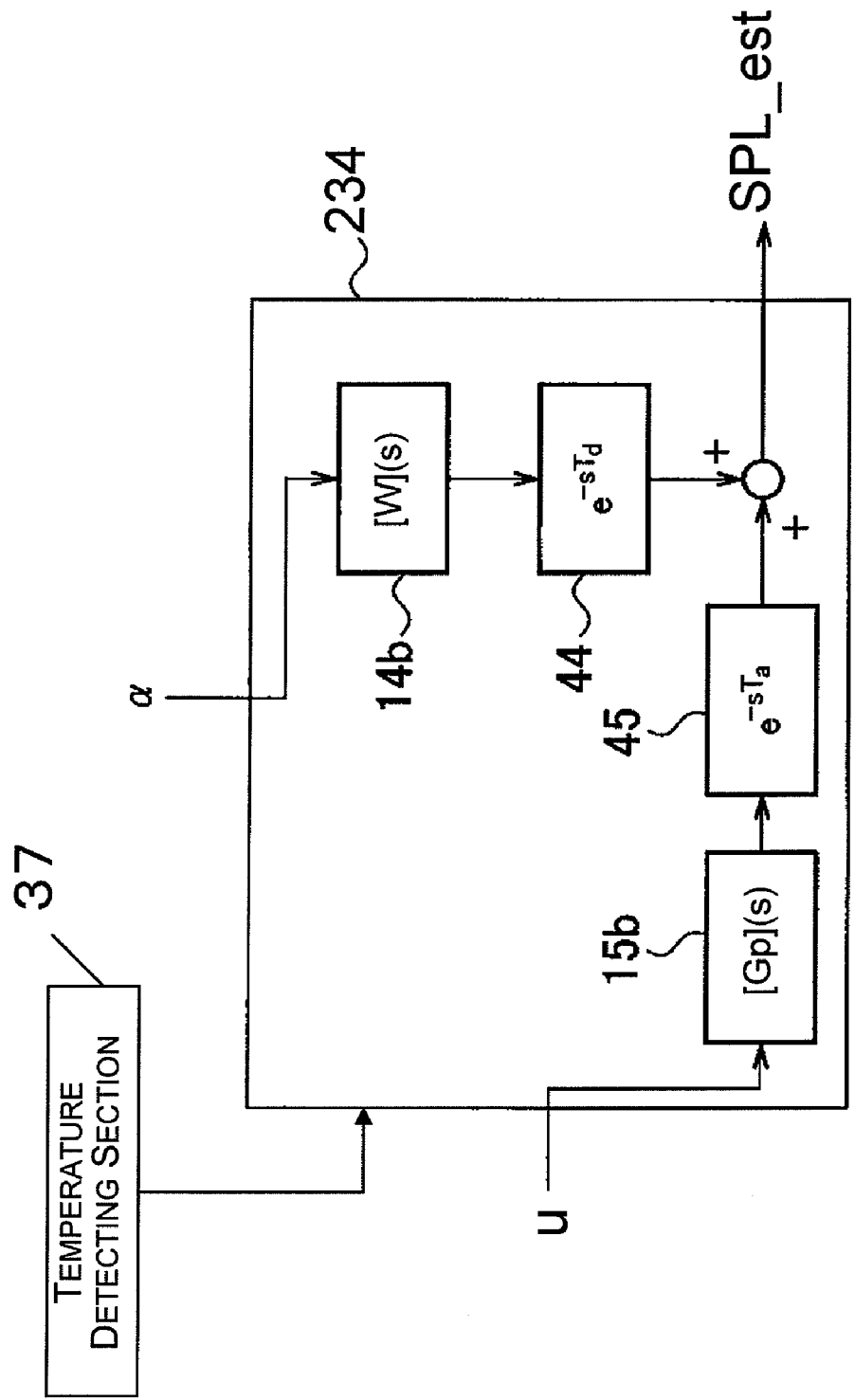
FIG. 12 is a schematic diagram of a noise estimating section in which the time lag of signal propagation is taken into account in estimating the noise in accordance with a fourth embodiment of the present invention.

Referring now to FIGS. 12 and 13, a noise estimating device and a noise estimating method in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The noise estimating device of the fourth embodiment includes a noise estimating section 234 as shown in FIG. 12. The noise estimating section 234 differs from the noise estimating section 34 of the first embodiment in that, in the fourth embodiment, the noise estimating section 234 is configured to take into account (i.e., remove) the time lag (propagation lag component) when the external input vibration f (FIG. 7) propagates through the air between the location of entry of the external vibration f and the control space 100 and the time lag in the transfer characteristics when the vibrations provided to the vehicle body from the piezo-actuators 20a and 20b become sound waves and propagate through the air from the locations of the piezo-actuators 20a and 20b to the control space 100. Thus, the accuracy of noise estimation can be further improved, and the effect of noise reduction is further improved.

As discussed above in the first embodiment, the transfer characteristics of air propagation between the acceleration signals $\alpha$ (e.g., the acceleration signals $\alpha_1$ to $\alpha_4$) and the control space 100 are designated as W(s) as shown Equation 12, and the transfer characteristics of air propagation between the locations of the actuators and the control space 100 are designated as Gp(s). Then, the transfer characteristics W(s) and the transfer characteristics Gp(s) depend on, for example, the temperature and other characteristics of the air in the vehicle interior space. Thus, a lag occurs in the signal propagation time.

Accordingly, in the fourth embodiment, the noise estimating section 234 is configured to take into account the time lag in signal propagation as shown in FIG. 12. More specifically, the noise estimating section 234 of the fourth embodiment is operatively coupled to a temperature detecting section 37 configured and arranged to detect the temperature within the vehicle, and the noise estimating section 234 is configured to switch or select the transfer characteristics W(s) and the transfer characteristics Gp(s) that are appropriate for the temperature detected by the temperature detecting section 37.

Then, the acceleration signals a detected by the acceleration sensor (e.g., the acceleration sensors 10a to 10d) are input into [W](s) (a first transfer characteristic model 14b), which is equivalent to W(s) with the time lag term being removed, and the resulting signals are then input into a time lag model $e^{-sTd}$ (a first time lag model 44). On the other hand, the control command value u (e.g., the control command values $u_1$ and $u_2$) transmitted from the actuators 20a and 20b are input into [Gp](s) (a second transfer characteristic model 15b), which is equivalent to Gp(s) with the time lag term being removed, and the resulting signals are then input to a time lag model $e^{-sTa}$ (a second time lag model 44).

Alternatively, as shown in FIG. 13, a modified noise estimating section 234' in accordance with the fourth embodiment is configured to compensate for the time lag $T_d$ during air propagation between the locations where the acceleration signals $\alpha$ are input and the control space 100 and the time lag $T_a$ during air propagation between the piezo-actuators 20a and 20b and the control space 100 by using a time lag compensation value $\tau$. The modified noise estimating section 234' comprises the transfer characteristics W(s) and the transfer characteristics Gp(s) as shown in Equation 16 below.

$$W(s) = e^{-sTd} \cdot [W](s)$$

$$Gp(s) = e^{-sTa} \cdot [Gp](s) \qquad \text{Equation 16}$$

Since the transfer characteristics W(s) and Gp(s) shown in Equation 16 are used, the noise estimating section 234' can easily shorten the time lags $T_a$ and $T_d$ using the time lag compensation $\tau$ without requiring change in any hardware. This characteristic is an advantage of using signals output by the noise estimating section 234 instead of microphones. When the time lag $T_d$ is greater than or equal to the time lag $T_a$, the time lag compensation $\tau$ is equal to the time lag $T_a$. The signals from the piezo-actuators 20a and 20b in such instances behave as if no time lag is present. In FIG. 13, the configuration of the modified noise estimating section 234' is shown in which the time lag is compensated for.

More specifically, FIG. 13 is a schematic diagram of the configuration of a noise estimating section 234' in which the time lag compensation is performed. The acceleration signals $\alpha$ (e.g., the acceleration signals $\alpha_1$ to $\alpha_4$) are first input into a first transfer characteristic model 14b and then input into a time lag model 44b in which the time lag is compensated for by $\tau$. Meanwhile, the control command values u (e.g., the control command values $u_1$ and $u_2$) to the piezo-actuators 20a and 20b are input into a second transfer characteristic model 15b and then input into a time lag model 45b in which the time lag is compensated for by the time lag compensation value $\tau$. The output signals of the first and second time lag models 44b and 45b are super-imposed, whereby the noise SPL within the vehicle can be estimated.

The method below may be used for calculating or estimating the time lags $T_a$ and $T_d$ for which compensation is made.

The time lag can be estimated by calculating the transfer distance. The time lag is fundamentally dependent on the speed of sound in air. For example, when the piezo actuators 20a and 20b are positioned in locations removed by a distance $d_a$ from the space within the vehicle for which noise is to be estimated, the time lag $T_a$ can be expressed by Formula 17 below using the speed $V_s$ of sound in air.

$$T_a = \frac{d_a}{V_s} \qquad \text{Equation 17}$$

Fifth Embodiment

Figure 14:
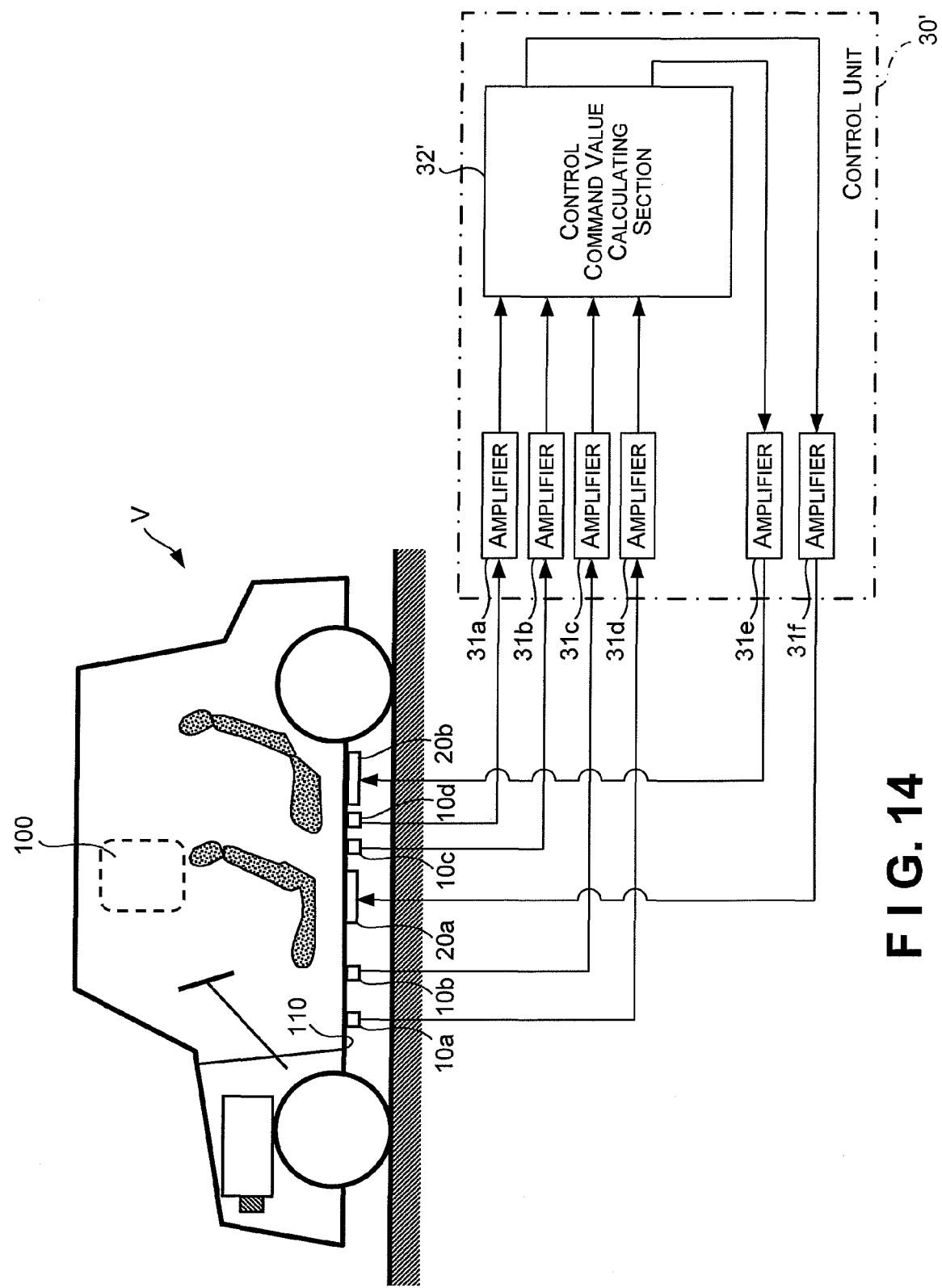
FIG. 14 is a simplified schematic diagram of a noise control apparatus in accordance with a fifth embodiment of the present invention.

Referring now to FIGS. 14 and 15, a noise control apparatus in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a single prime (').

The noise control apparatus of the fifth embodiment differs from the noise control apparatus of the first embodiment in that a control unit 30' of the fifth embodiment has signal lines that execute feedback control within a control command value calculating section 32'.

More specifically, in the control unit 30 of the first embodiment as illustrated in FIGS. 2 and 3, the signal lines are formed so that the control command values $u_1$ and $u_2$ that are output from the control command value calculating section 32 return to the control command value calculating section 32 in a feedback loop as shown in FIG. 2. Also, in the first embodiment, the control command values $u_1$ and $u_2$ output from the control command value calculating section 32 are converted from digital signals to analog signals by the D/A converting section 36, converted once again from analog signals to digital signals, and then input to the control command value calculating section 32. The control command values $u_1$ and $u_2$ input to the control command value calculating section 32 therefore lag by one step in the processing cycle in the first embodiment.

On the other hand, in the fifth embodiment of the present invention, instead of the configuration shown in FIGS. 2 and 3, the feedback of the control command values $u_1$ and $u_2$ in the control unit 30' is removed as in FIG. 14, and a feedback loop is formed within a control command value calculating section 32' as shown in FIG. 15.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A noise estimating device comprising:
   a plurality of sensors configured and arranged to be positioned in a plurality of prescribed locations on a vehicle body of a vehicle and configured and arranged to detect vibrations of the vehicle body; and
   an estimating section configured to
      estimate an external vibration value based on the vibrations detected by the sensors and transfer characteristics between the sensors and a vibration input location where an external vibration enters the vehicle body, with vibrations from a vehicle drive source being excluded when estimating the external vibration value, and
      to estimate a noise within a vehicle interior space based on the external vibration value and a transfer characteristic between the vibration input location and a reference region in the vehicle interior space.

2. The noise estimating device according to claim 1, wherein
   the estimating section is further configured to adjust the transfer characteristic between the vibration input location and the reference region according to a propagation lag component of a signal in ambient air when estimating the noise within the vehicle interior space.

3. A noise control apparatus comprising:
   a noise estimating device including
      a plurality of sensors configured and arranged to be positioned in a plurality of prescribed locations on a vehicle body of a vehicle and configured and arranged to detect vibrations of the vehicle body, and
      an estimating section configured to estimate an external vibration value based on the vibrations detected by the sensors and transfer characteristics between the sensors and a vibration input location where an external vibration enters the vehicle body, and to estimate a noise within a vehicle interior space based on the external vibration value and a transfer characteristic between the vibration input location and a reference region in the vehicle interior space; and
   an actuator configured and arranged to vibrate the vehicle body to produce a sound wave that cancels out the noise estimated by the noise estimating device,
   the estimating section of the noise estimating device being further configured to subtract a vibration component corresponding to a vibration of the vehicle body caused by the actuator from the vibrations detected by the sensors when estimating the noise.

4. The noise control apparatus according to claim 3, wherein the estimating section of the noise estimating device is further configured to adjust the transfer characteristic between the vibration input location and the reference region according to a propagation lag component of a signal in ambient air when estimating the noise.

5. The noise control apparatus according to claim 3, further comprising
a passenger information detecting section configured and arranged to detect passenger information including at least one of a number of passengers and a position of passengers in the vehicle,
the estimating section of the noise estimating device being further configured to select one of a plurality of transfer characteristics corresponding to the passenger information stored in advance based on the at least one of the number of passengers and the position of passengers detected by the passenger information detecting section as the transfer characteristic between the vibration input location and the reference region when estimating the noise.

6. A noise control apparatus comprising:
a noise estimating device including
a plurality of sensors configured and arranged to be positioned in a plurality of prescribed locations on a vehicle body of a vehicle and configured and arranged to detect vibrations of the vehicle body, and
an estimating section configured to estimate an external vibration value based on the vibrations detected by the sensors and transfer characteristics between the sensors and a vibration input location where an external vibration enters the vehicle body, and to estimate a noise within a vehicle interior space based on the external vibration value and a transfer characteristic between the vibration input location and a reference region in the vehicle interior space; and
an actuator configured and arranged to vibrate the vehicle body to produce a sound wave that cancels out the noise estimated by the noise estimating device,
the estimating section of the noise estimating device being configured to subtract a vibration component corresponding to a vibration of the vehicle body caused by driving a drive source of the vehicle from the vibrations detected by the sensors when estimating the noise.

7. The noise control apparatus according to claim 6, wherein
the estimating section of the noise estimating device is further configured to adjust the transfer characteristic between the vibration input location and the reference region according to a propagation lag component of a signal in ambient air when estimating the noise.

8. The noise control apparatus according to claim 6, wherein
the estimating section of the noise estimating device is further configured to subtract a vibration component corresponding to a vibration of the vehicle body caused by the actuator from the vibrations detected by the sensors when estimating the noise.

9. The noise control apparatus according to claim 6, further comprising
a passenger information detecting section configured and arranged to detect passenger information including at least one of a number of passengers and a position of passengers in the vehicle,
the estimating section of the noise estimating device being further configured to select one of a plurality of transfer characteristics corresponding to the passenger information stored in advance based on the at least one of the number of passengers and the position of passengers detected by the passenger information detecting section as the transfer characteristic between the vibration input location and the reference region when estimating the noise.

10. A noise estimating device comprising:
vibration detecting means for detecting vibrations of a vehicle body of a vehicle at a plurality of prescribed locations on the vehicle body;
external vibration estimating means for estimating an external vibration value based on the vibrations detected by the vibration detecting means and transfer characteristics between the prescribed locations and a vibration input location where an external vibration enters the vehicle body, with vibrations from a vehicle drive source being excluded when estimating the external vibration value; and
noise estimating means for estimating a noise within a vehicle interior space based on the external vibration value and a transfer characteristic between the vibration input location and a reference region in the vehicle interior space.

11. A noise estimating method comprising:
detecting vibrations of a vehicle body of a vehicle at a plurality of prescribed locations on the vehicle body;
estimating an external vibration value based on the vibrations detected and transfer characteristics between the prescribed locations and a vibration input location where an external vibration enters the vehicle body, with vibrations from a vehicle drive source being excluded when estimating the external vibration value; and
estimating a noise within a vehicle interior space based on the external vibration value and a transfer characteristic between the vibration input location and a reference region in the vehicle interior space.

12. The noise estimating method according to claim 11, wherein
the estimating the noise includes adjusting the transfer characteristic between the vibration input location and the reference region according to a propagation lag component of a signal in ambient air.

13. A noise controlling method comprising:
detecting vibrations of a vehicle body of a vehicle at a plurality of prescribed locations on the vehicle body;
estimating an external vibration value based on the vibrations detected and transfer characteristics between the prescribed locations and a vibration input location where an external vibration enters the vehicle body;
estimating a noise within a vehicle interior space based on the external vibration value and a transfer characteristic between the vibration input location and a reference region in the vehicle interior space; and
vibrating the vehicle body to produce a sound wave that cancels out the noise estimated,
the estimating of the noise including subtracting a vibration component corresponding to a vibration of the vehicle body caused by the vibrating of the vehicle body from the vibrations detected.

14. The noise controlling method according to claim 13, wherein
the estimating of the noise includes adjusting the transfer characteristic between the vibration input location and the reference region according to a propagation lag component of a signal in ambient air.

15. A noise controlling method claim 13, comprising:
detecting vibrations of a vehicle body of a vehicle at a plurality of prescribed locations on the vehicle body;

estimating an external vibration value based on the vibrations detected and transfer characteristics between the prescribed locations and a vibration input location where an external vibration enters the vehicle body;

estimating a noise within a vehicle interior space based on the external vibration value and a transfer characteristic between the vibration input location and a reference region in the vehicle interior space; and vibrating the vehicle body to produce a sound wave that cancels out the noise estimated, the estimating of the noise including subtracting a vibration component corresponding to a vibration of the vehicle body caused by driving a drive source of the vehicle from the vibrations detected.

16. The noise controlling method according to claim 15, wherein the estimating of the noise includes adjusting the transfer characteristic between the vibration input location and the reference region according to a propagation lag component of a signal in ambient air.

17. The noise controlling method according to claim 15, wherein the estimating of the noise includes subtracting a vibration component corresponding to a vibration of the vehicle body caused by the vibrating of the vehicle body from the vibrations detected.

18. The noise controlling method according to claim 15, further comprising detecting passenger information including at least one of a number of passengers and a position of passengers in the vehicle, the estimating of the noise including selecting one of a plurality of transfer characteristics corresponding to the passenger information stored in advance based on the at least one of the number of passengers and the position of passengers detected by the detecting of the passenger information as the transfer characteristic between the vibration input location and the reference region.

19. The noise controlling method according to claim 13, further comprising detecting passenger information including at least one of a number of passengers and a position of passengers in the vehicle, the estimating of the noise including selecting one of a plurality of transfer characteristics corresponding to the passenger information stored in advance based on the at least one of the number of passengers and the position of passengers detected by the detecting of the passenger information as the transfer characteristic between the vibration input location and the reference region.

* * * * *